(12) United States Patent
Kullin

(10) Patent No.: US 9,316,263 B2
(45) Date of Patent: Apr. 19, 2016

(54) CAGE FOR A TOROIDAL ROLLER BEARING

(75) Inventor: Arne Lars Jonas Kullin, Landvetter (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/118,325

(22) PCT Filed: May 7, 2012

(86) PCT No.: PCT/SE2012/000066
§ 371 (c)(1),
(2), (4) Date: Feb. 19, 2014

(87) PCT Pub. No.: WO2012/158087
PCT Pub. Date: Nov. 22, 2012

(65) Prior Publication Data
US 2014/0153857 A1    Jun. 5, 2014

(30) Foreign Application Priority Data
May 17, 2011 (SE) ....................................... 1100372

(51) Int. Cl.
*F16C 33/46* (2006.01)
*F16C 23/08* (2006.01)
(Continued)

(52) U.S. Cl.
CPC .............. *F16C 43/065* (2013.01); *B21D 53/12* (2013.01); *F16C 23/08* (2013.01); *F16C 23/086* (2013.01); *F16C 33/4623* (2013.01); *F16C 33/4635* (2013.01); *F16C 33/4682* (2013.01); *F16C 43/06* (2013.01); *F16C 43/08* (2013.01); *F16C 19/26* (2013.01); *Y10T 29/4968* (2015.01); *Y10T 29/49698* (2015.01)

(58) Field of Classification Search
CPC ...... F16C 19/26; F16C 23/08; F16C 33/4635; F16C 33/4623; F16C 43/06; F16C 43/065; Y10T 29/49691; B21D 53/12
USPC ......... 384/572, 576–578, 580, 569, 559, 565, 384/584; 29/898.061, 898.067
See application file for complete search history.

(56) References Cited

U.S. PATENT DOCUMENTS

| 1,346,147 A | 7/1920 | Webster |
| 1,982,896 A | 12/1934 | Ackerman |

(Continued)

FOREIGN PATENT DOCUMENTS

| DE | 923584 C | 2/1955 | |
| DE | 10119893 C1 * | 11/2002 | .............. F16C 33/46 |

(Continued)

*Primary Examiner* — Marcus Charles
(74) *Attorney, Agent, or Firm* — Bryan Peckjian; SKF USA Inc. Patent Dept.

(57) ABSTRACT

A cage for separating rollers in a toroidal roller bearing. The cage comprises a first and second annular ring, a plurality of elongated axial members interposed between the first and second annular ring to thereby form a number of roller pockets. The cage further presents a portion extending radially inwardly on at least one of the first and second annular ring. The portion further extends in at least a part of the circumference of the at least one first and second annular ring. The radially outer peripheral surface of the annular ring presenting the portion presents axial grooves at least at the circumference having the portion, wherein each axial groove is located at the axial end face of each roller pocket in such a way that a roller can be inserted and pulled out via the axial groove into and out of each roller pocket.

11 Claims, 4 Drawing Sheets

(51) Int. Cl.
*F16C 43/08* (2006.01)
*F16C 43/06* (2006.01)
*B21D 53/12* (2006.01)
*F16C 19/26* (2006.01)

(56) References Cited

U.S. PATENT DOCUMENTS

| | | | | |
|---|---|---|---|---|
| 2,267,863 | A | * 12/1941 | Hickling | 29/898.067 |
| 2,342,340 | A | * 2/1944 | Hickling | 29/898.067 |
| 2,365,154 | A | * 12/1944 | Storz | F16C 33/4605 384/570 |
| 2,946,633 | A | * 7/1960 | Gothberg | 384/576 |
| 3,188,719 | A | * 6/1965 | Howles | 29/898.064 |
| 3,206,263 | A | * 9/1965 | Altson | 384/578 |
| 3,353,881 | A | * 11/1967 | Steinert | F16C 33/46 384/577 |
| 3,399,008 | A | * 8/1968 | Farrell | F16C 9/04 384/577 |
| 4,208,078 | A | * 6/1980 | Miki | 384/572 |
| 4,629,339 | A | * 12/1986 | Morinaga | 384/576 |
| 4,934,841 | A | * 6/1990 | De Vito | 384/572 |
| 5,009,525 | A | * 4/1991 | Brockmuller et al. | 384/580 |
| 5,255,985 | A |  10/1993 | Alling | |
| 6,406,190 | B1 | * 6/2002 | Yoon | F16C 33/4694 384/551 |
| 7,571,543 | B2 | * 8/2009 | Kobayashi et al. | 29/898.067 |
| 2009/0154861 | A1 | * 6/2009 | Becker et al. | 384/569 |

FOREIGN PATENT DOCUMENTS

| | | | | |
|---|---|---|---|---|
| EP | 0520968 | A1 | 12/1992 | |
| EP | 0520968 | B1 | 12/1992 | |
| EP | 1500834 | A1 * | 1/2005 | F16C 33/46 |
| JP | 2008019986 | A * | 1/2008 | |
| JP | 2008064134 | A * | 3/2008 | |
| JP | 2008069875 | A * | 3/2008 | |
| JP | 2008138873 | A * | 6/2008 | |
| JP | 2009092162 | A * | 4/2009 | |
| JP | 2012132506 | A * | 7/2012 | |

* cited by examiner

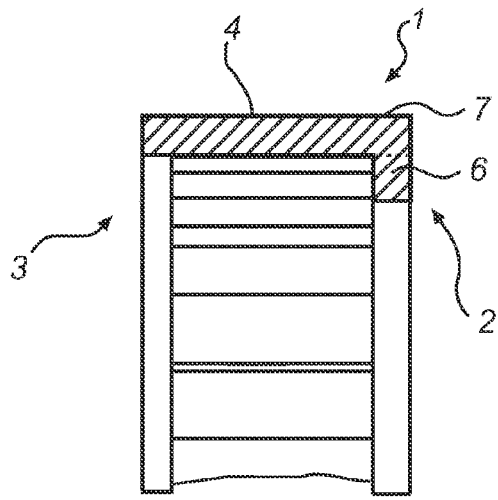
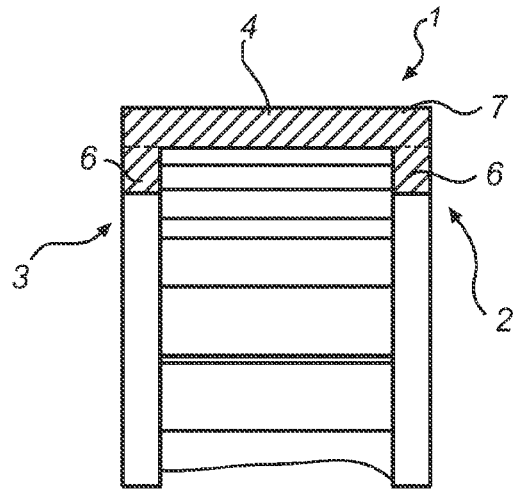
Fig. 1  Fig. 2
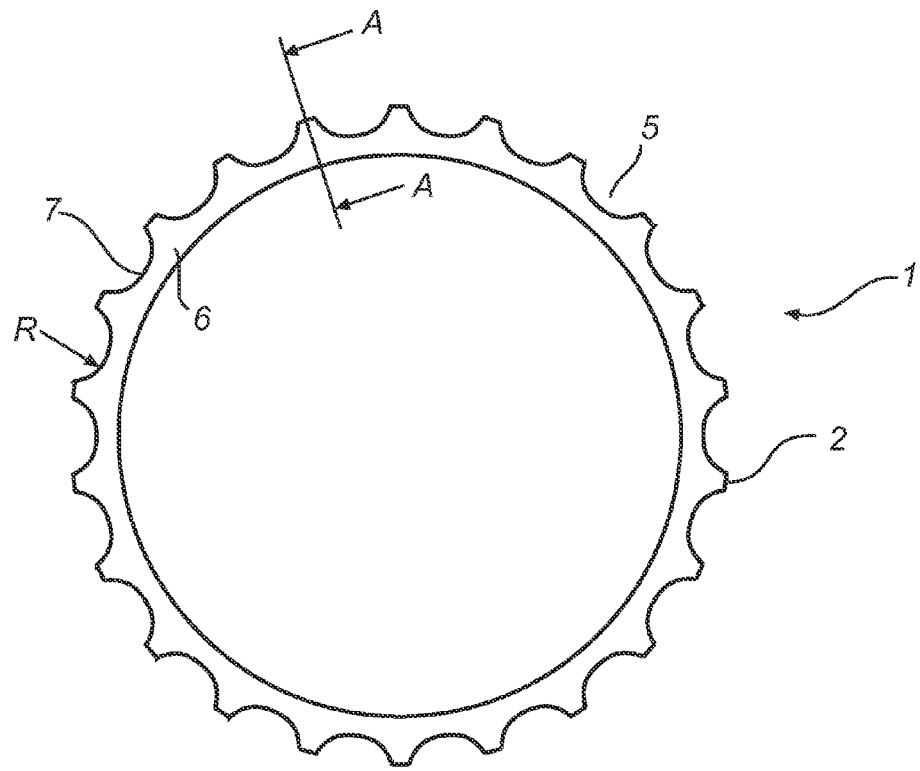
Fig. 3

CAGE FOR A TOROIDAL ROLLER BEARING

TECHNICAL FIELD OF THE INVENTION

According to a first aspect, the invention concerns a cage for a toroidal roller bearing.

According to a second aspect, the invention concerns a toroidal roller bearing having a cage according to the first aspect of the invention.

According to a third aspect, the invention concerns a method for assembling or dismounting a toroidal roller bearing.

BACKGROUND OF THE INVENTION

Toroidal roller bearings are well known. The bearing type is characterized by its ability to be able to angularly misalign and axially displace the inner ring and the outer ring of the bearing. This functionality is advantageous in several different types of applications. One common bearing set up on an axle is to mount one toroidal roller bearing, the non-locating bearing, at a first position and to mount a spherical roller bearing, the locating bearing, at a second position. There are obviously many other types of bearing arrangements possible with a toroidal roller bearing.

It is also well known to have a cage, also known as a retainer, in the toroidal roller bearing for separating and holding the roller elements in the bearing. One such cage is for example described in the European patent EP0520968B1 presenting a cage for a roller bearing. The cage is provided with pockets, each one of which is intended to receive a roller. The cage is further designed with opposed guiding surfaces on lateral bars in the pocket, which guiding surfaces are intended to cooperate with a roller received in the pocket, at the axial middle portion of said roller. The guiding surfaces are arranged on middle portions of the cage, which middle portions are bent inwardly. The cage thereby will be centered by means of the guiding surfaces at the same time as the bars have a guiding function and prevent two adjacent rollers from contacting each other. The guiding surfaces are designed in appropriate manner for ascertaining the centering of the cage. This cage design is thus centered and guided by the rollers in the toroidal roller bearing. One drawback with this cage design is that it makes it difficult to assemble wider and larger toroidal roller bearings. For some certain widths, it is impossible to insert the roller elements into the pockets of the cage at assembly of the bearing. A solution to this drawback for wider and larger bearings has been to provide a split cage design. For instance, one of the annular rings of the cage may be fastened after the roller elements have been inserted into the bearing and the cage pockets. The annular ring may then be fastened by e.g. screws and bolts. Furthermore, the cage presented in EP0520968B1 is a roller guided cage, which not always is preferable.

SUMMARY OF THE INVENTION

Thus, an object of the present invention is to provide a cage for a toroidal roller bearing that avoids at least one of the drawbacks of the prior art. More specifically, the object of the present invention is to provide a cage for a toroidal roller bearing that facilitates assembly and disassembly of the toroidal roller bearing and that also is a cage that provides a stable and reliable performance during operation of the roller bearing.

According to the first aspect of the invention, the object of the invention is achieved by a cage design presented in claim 1, which presents a cage for separating rollers in a toroidal roller bearing. The toroidal roller bearing has an outer and an inner ring, wherein said toroidal roller bearing allows for axial and angular displacement between said outer and inner ring. The cage comprises a first and second annular ring displaced axially from each other, a plurality of elongated axial members interposed between the first and second annular ring to thereby form a number of roller pockets. Each roller pocket is meant to receive at least one roller element. The cage further presents a portion extending radially inwardly on at least one of the first and second annular ring, and the portion is located at least partly at a radius being smaller than the radial location of the elongated axial members. The portion further extends in at least a part of the circumference of the at least one first and second annular ring. The radially outer peripheral surface of the annular ring presenting the portion presents axial grooves at least at the circumference having the portion, wherein each axial groove is located at the axial end face of each roller pocket in such a way that a roller can be inserted and pulled out via the axial groove into and out of each roller pocket. This cage design has the advantage that it makes it possible to assemble and disassemble a wider range of toroidal roller bearings, especially wider and larger bearings, while having a cage that is inner ring guided and thus provides a more stable and reliable running during operation. Moreover, there is no need to have a split cage design. Thus, it will be less separate components in the bearing, e.g. no bolts or screws for attaching a separate annular ring to a cage as described above.

In this document, the word axial and radial is used frequently. If not stated differently for any of the presented embodiments of the invention, it refers to the geometry of the toroidal roller bearing and the cage. Axial means a direction following an imaginary line that intersect the center points of the cage and the roller bearing and that is perpendicular to a radial direction of the bearing and the cage. Radial means a radial direction of the bearing and the cage that origin from the center points of the bearing and the cage.

In an embodiment of the cage, the radially inwardly extending portion extends in one third of the circumference of the annular ring. In an embodiment of the cage, the radially inwardly extending portion extends in half the circumference of the annular ring. In an embodiment of the cage, the radially inwardly extending portion extends in two thirds of the circumference of the annular ring. In an embodiment of the cage, the radially inwardly extending portion extends in the whole circumference of the annular ring. In an embodiment of the cage, the radially inwardly extending portion extends in a plurality of extensions in the circumference of the annular ring. The portion may for instance extend in two extensions, wherein the extensions are situated on opposite sides of the annular ring.

In an embodiment of the cage, at least one of the axial grooves presents a radius essentially matching a radius of a roller element being meant to be received in the said roller pocket. Due to this the axial groove is adapted to be able to facilitate insertion and pulling out of the roller element. Also, by having an axial groove that essentially matches the largest radius of the roller element, the strength of the cage will not be too weak.

In an embodiment of the cage, the cage presents a radially inwardly extending portion on the first and the second annular ring. Thus, there may be portions and axial grooves on both the annular rings. Thereby, the roller elements may be inserted or pulled out from both sides of the bearing. Also, the design of the annular rings may be symmetric, leading to a more stable cage during operation.

In an embodiment, the cage is made of a polymer or metal. There are many different types of polymers and metals that may be used for a cage, e.g. brass, iron, steel, polyamide, glass fiber reinforced polyamide etc. In an embodiment, the cage is elastic in such a way that it can be compressed so that at least one of the annular rings attains an essentially oval shape. This leads to that it may be easier to insert and pull out roller elements of the bearing.

In an embodiment, the cage is made in one piece. The design of the cage with the portion and the annular grooves leads to that there is no need to have a split cage design. Thus the cage will only comprise one separate component, and may thus be easier and cheaper to manufacture. For instance, if the cage is a polymer cage, it may be injection molded in one piece. Also, the cage will be more stable leading to better performance during operation of the bearing. The reliability of the cage will also increase.

In an embodiment, a radially inner peripheral surface of the portion of the cage is configured to be able to be in sliding contact with the inner ring of the toroidal roller bearing. Thus, the cage may be inner ring guided. This is a more stable and reliable guidance compared to for instance a roller guided cage as presented in the prior art.

In an embodiment of the cage, the radially inner peripheral surface of the portion has a friction coefficient μ being equal or less than 0.1. If the friction coefficient is low, the resisting force appearing between the inner ring and the portion will be low when the portion is in contact with the cage during operation of the bearing. Thus, the inner ring guidance will have a low affect on the resistant friction forces in the bearing. A bearing having a low rolling and sliding friction is preferable, since friction leads to energy losses in the bearing. A low friction bearing will thus be a more environmentally friendly bearing. In a further embodiment, the radially inner peripheral surface of the portion is designed so that a sufficient and good hydrodynamic lubricant film can be built up between the surface and the corresponding surface of the inner ring of the toroidal roller bearing.

According to the second aspect of the invention, it concerns a toroidal roller bearing which allows for angular and axial displacement. The toroidal roller bearing comprises an inner ring, an outer ring, a plurality of roller elements and a cage according to the first aspect of the invention. All embodiments of the first aspect of the invention are applicable to all embodiments of the second aspect of the invention and vice versa. The toroidal roller bearing comprises curved roller elements separated in a tangential direction by the cage. In addition, the toroidal roller bearing comprises an inner and an outer ring having raceways with curved profiles which substantially conform with longitudinal curved profiles of the roller elements, wherein the curved profiles have a substantially larger radius of curvature in relation to the distance between a center axis of the toroidal roller bearing and the inner ring raceway. For example, the ratio between the radius of the curved profiles and the distance between the center axis of the toroidal roller bearing is at least more than 2, or 10, or 20. The toroidal bearing with the cage according to the first aspect of the invention leads to an improved bearing. For example, it will be easy to assemble and insert roller elements into the bearing. It will also facilitate dismounting of the bearing. Also, the cage will lead to a more stable and reliable bearing. The production cost of the bearing may also be lower.

According to the third aspect, the invention concerns a method for assembling or dismounting a toroidal roller bearing having an outer and an inner ring. The toroidal roller bearing allows for axial and angular displacement between said outer and inner ring, and the toroidal roller bearing comprises a cage according to the first aspect of the invention. It should be pointed out that all embodiments of the third aspect of the invention are applicable to all embodiments of the first and second aspect of the invention and vice versa. The method comprises the steps of:

1) angularly displacing the inner ring relative the outer ring,
2) angularly and axially displacing the cage relative the inner ring in such a way that a part of the circumference of the radially inwardly extending portion is located axially outside the inner ring, and
3) inserting or pulling out roller elements into or out of the roller pockets of the cage at the location where the portion is located axially outside the inner ring.

The method has the advantage that it will facilitate assembling and dismounting of the bearing. It will reduce the risk of roller elements falling out from the bearing after the roller elements have been properly inserted into the bearing. By rotating the inner ring and the cage relative the outer ring during assembling or dismounting, more roller pockets will be at the location where the portion is axially outside the inner ring of the bearing, and thus more roller elements may be inserted or pulled out. For some bearing types and sizes, it may not be needed to have a portion and axial grooves for all roller pockets in the whole circumference of one of the annular rings of the cage. It may thus be possible to first insert a number of roller elements into roller pockets without a portion and axial grooves, followed by inserting the last number of roller elements into roller pockets presenting the portion and axial grooves. The same applies when dismounting the bearing, but in the opposite sequence compared to when assembling the bearing.

In an embodiment of the method, when assembling the bearing, it further comprises a step of inserting the cage between the inner ring and the outer ring. This step is executed at least before the step of angularly and axially displacing the cage relative the inner ring. In an embodiment of the method, when dismounting the bearing, it further comprises a step of removing the cage from the inner ring and the bearing. This step is executed at least after the step of pulling out roller elements out of the roller pockets of the cage at the location where the portion is located axially outside the inner ring.

In an embodiment of the method, when assembling the bearing, it further comprises a following step by angularly aligning the inner ring and the outer ring after inserting roller elements into the roller pockets of the cage.

BRIEF DESCRIPTION OF DRAWINGS

Below, a more detailed description of a number of preferred embodiments will be described. It should be noted that the accompanying drawings are not drawn to scale, and in some cases specific details may have been exaggerated in order to better explain the invention. Furthermore, the invention as claimed is not limited to the embodiments described and shown, but modifications are possible for a skilled person within the scope of the claims.

FIG. 1 shows a cross section of a cage according to an embodiment of the invention. The cross section is a cross section along a plane intersecting the axial center line of the cage.

FIG. 2 shows a cross section of a cage according to another embodiment of the invention. The cross section is a cross section along a plane intersecting the axial center line of the cage.

FIG. 3 shows a side view of a cage according to an embodiment of the invention.

DETAILED DESCRIPTION OF THE INVENTION

Figure 4:
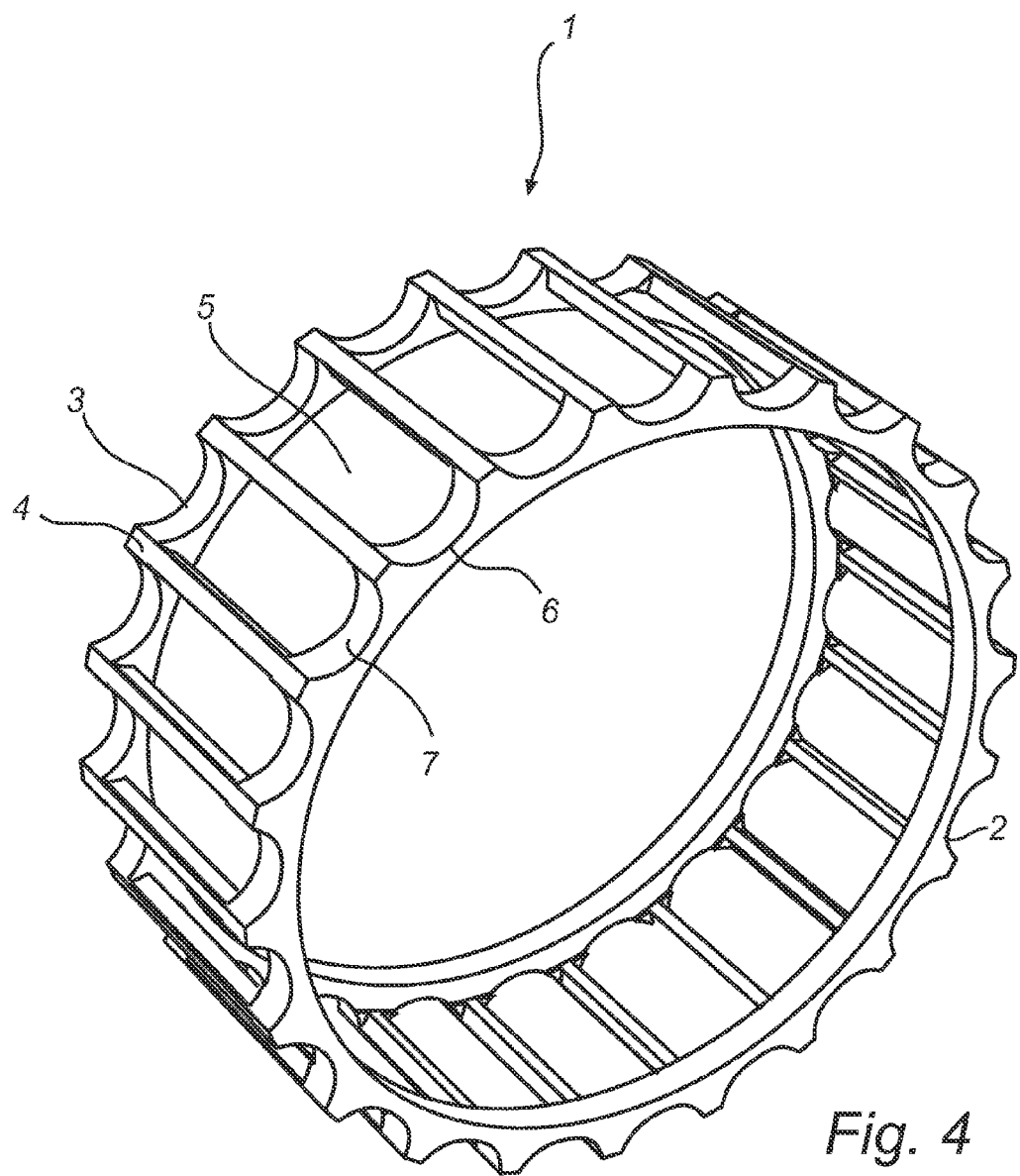
FIG. 4 illustrates a three dimensional view of a cage according to the invention.

Below, the invention will now be further explained with support from the accompanying drawings.

FIG. 1 shows a cross section of a cage 1 according to the invention. The cross section is a cross section of a plane intersecting the axial center line of the cage 1. Furthermore, the cross section is a cross section along a line A-A of FIG. 3. The cage 1 presents a first annular ring 2, a second annular ring 3 and elongated axial members 4 (one indicated in the figure). The axially elongated members 4 may also be called pins or lateral bars or any other appropriate name recognized by a skilled person. The two annular rings 2 and 3 and two adjacent axial elongated members 4 form a roller pocket 5 (not indicated in this figure). The roller pocket 5 is meant to receive a roller element of a toroidal roller bearing. The function of the cage is to retain and guide the roller elements of the roller bearing. Furthermore, the cage 1 presents a radially inwardly extending portion 6 on the annular ring 2. Also, on the annular ring 2 is a number of axial grooves 7 presented. The axial grooves 7 are situated on the annular ring 2 essentially between two adjacent axial members 4 such that they are connected to roller pockets 5 of the cage. Due to this, it will be possible to insert and pull out roller elements of a toroidal roller bearing presenting the cage 1. The portion 6 can function as a guide for the cage 1, i.e. the cage 1 may be inner ring guided. Furthermore, the portion 6 is a part of the annular ring 2 and connects two adjacent axial elongated members 4, and thereby forms a roller pocket 5. The portion 6 extends radially inwardly and is at least partly located at a radius of the cage being smaller than the radius of the elongated axial members 4. This leads to that it will be easier to insert or pull out roller elements from the roller pockets 5 presenting a portion 6 and an axial groove 7, which will be further explained and illustrated in FIG. 6.

FIG. 2 is another cross section of another embodiment according to the invention. The cross section is a cross section along a line A-A of FIG. 3 as in FIG. 1 described above. The cage 1 presents an annular ring 2, an annular ring 3 and axial elongated members 4. The annular rings 2 and 3 and two adjacent axial members 4 forms a roller pocket 5 (not shown in this figure) meant to receive a roller element. In this embodiment, portions 6 are presented on the annular ring 2 and on the annular ring 3 respectively. Furthermore, axial grooves 7 are also presented on the annular ring 2 and on the annular ring 3. Due to this configuration, it will be possible to insert and pull out roller elements on both sides of the roller pockets 5. Furthermore, the portions 6 on the annular rings 2 and 3 may function as an inner ring guidance of the cage 1, which may lead to an even more stable and reliable running of the roller bearing presenting the cage 1. The portions 6 may not be extending in the whole circumference of the bearing, but may only extend in some parts of the bearing. Furthermore, there may be several extensions of portions 6 along the circumference of the annular ring 2 and 3. The portion 6 extends radially inwardly and is at least partly located at a radius of the cage being smaller than the radius of the elongated axial members 4. This leads to that it will be easier to insert or pull out roller elements from the roller pockets 5 presenting a portion 6 and an axial groove 7, which will be further explained and illustrated in FIG. 6.

FIG. 3 illustrates a side view of a cage 1 according to the invention. The side view is a side view of a cross section of a cage 1 according to the invention. The cross section is a plane perpendicular to the axial center line of the cage 1. The plane intersects an annular ring 2, 3 (only referred to as 2 in this figure) of a cage 1, wherein the annular ring 2 presents a portion 6 and axial grooves 7. The axial grooves 7 are in the proximity of the roller pockets 5 so that a roller element can be inserted or pulled out of the roller pocket 5. In this embodiment, the portion 6 extends in the whole circumference of the annular ring 2. Furthermore, the axial grooves 7 have a radius R presented in the figure. The radius R is preferably the same or slightly larger as the radius of the roller element that is meant to be inserted or pulled out of the bearing. However, there are other possible shapes of the axial groove 7. In an embodiment, the axial groove 7 has a radius R being larger than the roller element that is meant to be inserted or pulled out of the roller pocket 5. In another embodiment, the axial groove presents an oval shape, i.e. the radius R is not constant. The portion 6 extends radially inwardly and is at least partly located at a radius of the cage being smaller than the radius of the elongated axial members 4 (not shown in this figure). This leads to that it will be easier to insert or pull out roller elements from the roller pockets 5 presenting a portion 6 and an axial groove 7, which will be further explained and illustrated in FIG. 6.

FIG. 4 is a three dimensional view of a preferred embodiment of the cage 1 according to the invention. In this illustration, annular rings 2 and 3 are presented, axial elongated members 4 are between the annular rings 2 and 3 and thereby form a number of roller pockets 5 meant to receive roller elements. At least one roller element may be received in each roller pocket 5, but each roller pocket 5 may also receive more roller elements. Furthermore, the annular rings 2 and 3 presents radially inwardly extending portions 6 and axial grooves 7. Furthermore, the portion 6 extends radially inwardly and is at least partly located at a radius of the cage being smaller than the radius of the elongated axial members 4. This leads to that it will be easier to insert or pull out roller elements from the roller pockets 5 presenting a portion 6 and an axial groove 7, which will be further explained and illustrated in FIG. 6.

Figure 5:
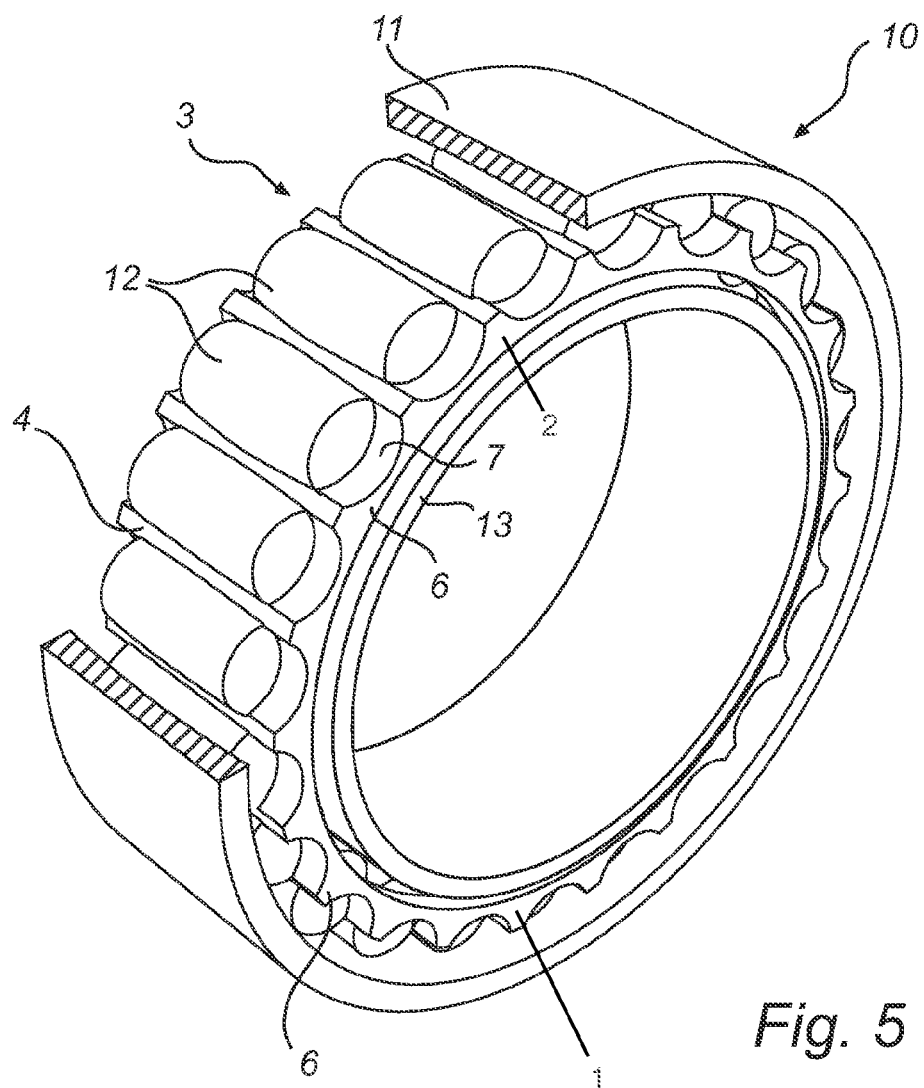
FIG. 5 illustrates a toroidal roller bearing according to the invention.

FIG. 5 shows a toroidal roller bearing 10 according to the second aspect of the invention. As can be seen, the bearing 10 has been opened up in order to better clarify the invention. The toroidal roller bearing 10 presents an outer ring 11, an inner ring 13 and roller elements 12. Furthermore, the bearing 10 presents a cage 1 according to the first aspect of the invention. The cage 1 presents annular rings 2 and 3, axial elongated members 4, portions 6 on each annular ring 2, 3 and axial grooves 7 on the annular rings 2, 3. The cage 1 may be inner ring guided and may thereby be able to come in contact with the inner ring 13 during operation of the bearing. The surface of the portion 6 coming into contact with the inner ring 13 may have a low friction coefficient in order to not lead to a too high friction force, which would increase the total rolling and sliding friction in the bearing 10. Furthermore, the annular rings 2, 3 with the portion 6 will prevent the roller elements from falling out of the bearing 10 during operation. In order for the roller elements 12 to be inserted or pulled out, the cage 1 needs to be axially displaced and angularly misaligned relative the inner ring 13, which is further elaborated in FIG. 6.

Figure 6:
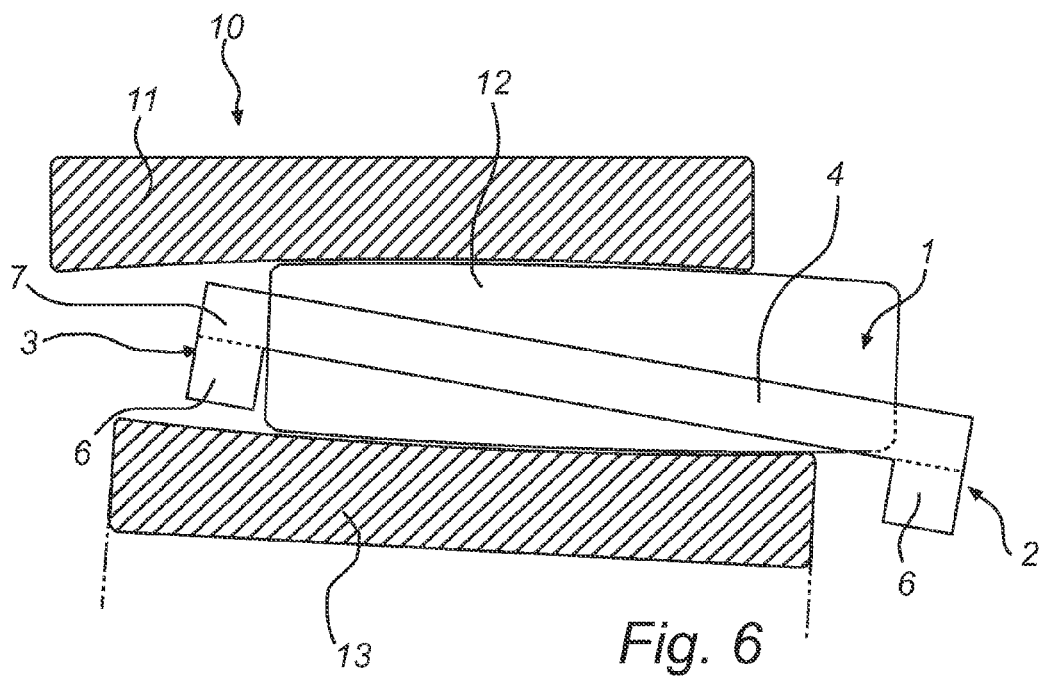
FIG. 6 is a cross section of a toroidal roller bearing according to the invention. The cross section is a cross section of a plane, wherein the axial center line of the bearing is in the plane.

FIG. 6 shows a cross section of a toroidal roller bearing 10 according to the invention. The cross section is defined by a plane, wherein the axial center line of the bearing 10 is in the plane. In this illustration, the inner ring 13 and the outer ring 11 has been angularly misaligned. In addition, the cage 1 has been axially displaced and angularly misaligned relative the inner ring 13 so that the portion 6 is outside the axial end face of the inner ring 13. As can be seen, the portion 6 extends radially inwardly and is at least partly located at a radius being smaller than the radius of the elongated axial members 4, and thereby the cross section of the cage 1 attains a U-shape. This leads to that it will be easier to insert or pull out the roller element 12 from the roller pocket 5 presenting the portion 6 and the axial groove 7. Due to this configuration, the portion 6 will be below the end face opening of the bearing 10, which is defined by the area between the inner ring 13 and the outer ring 11 at the axial end face of the bearing 10. This leads to that it will be possible to insert the roller element 12 into the roller pocket 5 (not indicated in this figure) via the axial groove 7. Thus, when assembling or dismounting the bearing 10, the cage needs to be in this position relative the inner ring 13 and the outer ring 11. In order to further facilitate assembling and dismounting of the bearing 10, the cage 1 may be elastic so as to be able to compress annular ring 2 to attain an oval shape. Thus, if the portion will not totally reveal the axial end face opening of the bearing 10, it may be possible to compress the annular ring 2 in such a way that the portion 6 will not reduce the size of the open area between the two rings 11 and 13. Furthermore, it is not always needed that the portion 6 and the cage 1 is configured to reveal the total possible area between the rings 11 and 13. It may be possible to insert and pull out the roller element 12 even if the portion would reduce the open area between the rings 11 and 13. The cage 1 may also be made of different materials, e.g. a polymer or even a metal as described above.

Figure 7:
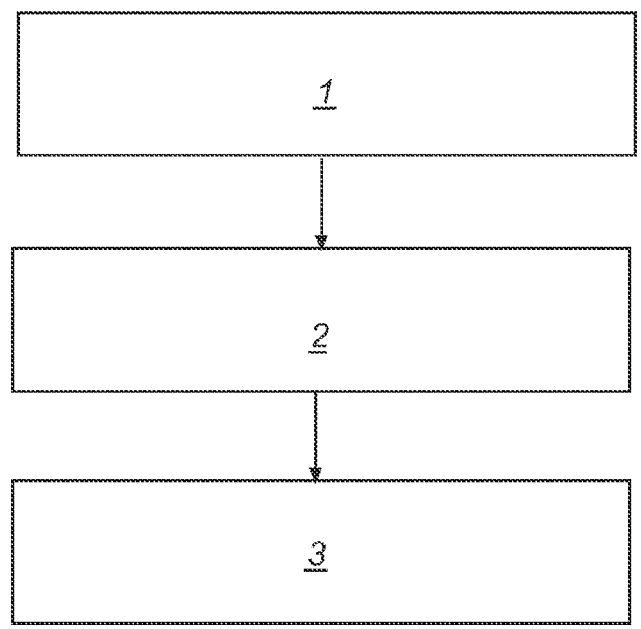
FIG. 7 shows is an illustration for explaining the method according to the invention.

FIG. 7 is an illustration of the steps in the method according to the third aspect of the invention. In step 1 in the method, the inner ring is angularly displaced relative the outer ring of the toroidal roller bearing. In step 2, the cage is angularly and axially displaced relative the inner ring of the bearing. In step 3, a roller element of the bearing is inserted or pulled out of the bearing at the location where the portion is located axially outside the inner ring, as illustrated in FIG. 6. There may be additional steps (before, after and in-between the presented steps) in the method for assembling and dismounting the bearing. For example, before step 1, the cage may be inserted into the bearing at assembly, and after step 3 the cage may be removed from the bearing at disassembly, or the cage 1 and the inner ring 13 may be aligned relative the outer ring 11 at assembly.

As previously stated, there are further possible embodiments of the invention which can be recognized by a person skilled in the field within the scope of the claims. The described and illustrated embodiments are not in any way meant to limit the inventive idea.

The invention claimed is:

1. A cage for separating rollers in a toroidal roller bearing having an outer and an inner ring, the toroidal roller bearing allowing for axial and angular displacement between the outer and inner ring, the cage comprising,
   a first and second annular ring displaced axially from each other,
   a plurality of elongated axial members interposed between the first and second annular ring and thereby forming a number of roller pockets, each roller pocket meant to receive at least one roller element,
   a portion extending radially inwardly on at least one of the first and second annular ring, the portion is at least partly located at a radius being smaller than the radial location of the elongated axial members, the portion further extending in at least a part of the circumference of the at least one first and second annular ring,
   wherein a radially outer peripheral surface of the at least one of the first and second annular ring presents axial grooves at least at the circumference having the portion, each of the axial grooves is located at the axial end face of each roller pocket in such a way that a roller can be inserted and pulled out via the axial groove into and out of each roller pocket, the axial grooves each having a groove radius equal to a roller element radius, the first and second annular ring being flexible such that the first and second annular ring can be compressed from a first position in which the first and second annular rings are circularly shaped and configured for operation in the toroidal roller bearing and a second position in which at least one of the first and second annular rings attains an oval shape such that the at least one roller element can be removed from the cage while the cage remains positioned between the inner and outer rings of the toroidal roller bearing.

2. The cage according to claim 1, wherein the radially inwardly extending portion extends: the whole circumference of the annular ring.

3. The cage according to claim 1, further comprising a radially inwardly extending portion disposed on the first and the second annular ring.

4. The cage according to claim 1, wherein the cage is made of a polymer or metal.

5. The cage according to claim 1, wherein the cage is made in one piece.

6. The cage according to claim 1, further comprising a radially inner peripheral surface of the portion configured to be in sliding contact with the inner ring of the toroidal roller bearing.

7. The cage according to claim 6, wherein the radially inner peripheral surface of the portion has a friction coefficient μ being less than or equal to 0.1.

8. A toroidal roller bearing which provides angular and axial displacement, the toroidal roller bearing comprising an inner ring, an outer ring, a plurality of roller elements and a cage having;
   a first and second annular ring displaced axially from each other,
   a plurality of elongated axial members interposed between the first and second annular ring and thereby forming a number of roller pockets, each roller pocket meant to receive at least one roller element,
   a portion extending radially inwardly on at least one of the first and second annular ring,
   wherein the portion is at least partly located at a radius being smaller than the radial location of the elongated axial members, the portion further extending in at least a part of the circumference of the at least one first and second annular ring,
   wherein the radially outer peripheral surface of the annular ring presenting the portion presents axial grooves at least at the circumference having the portion,
   wherein each axial groove is located at the axial end face of each roller pocket in such a way that a roller can be inserted and pulled out via the axial groove into and out of each roller pocket, the axial grooves each having a groove radius equal to a roller element radius, the first and second annular ring being flexible such that the first and second annular ring can be compressed from a first position in which the first and second annular rings are circularly shaped and configured for operation in the toroidal roller bearing and a second position in which at least one of the first and second annular rings attains an oval shape such that the at least one roller element can be removed from the cage while the cage remains positioned between the inner and outer rings of the toroidal roller bearing.

9. A method for assembling or disassembling a toroidal roller bearing, the method comprising the steps of:
providing the toroidal roller bearing comprising an inner ring, an outer ring, a plurality of roller elements and a cage having;
a first and second annular ring displaced axially from each other,
a plurality of elongated axial members interposed between the first and second annular ring and thereby forming a number of roller pockets, each roller pocket meant to receive at least one roller element,
a portion extending radially inwardly on at least one of the first and second annular ring,
wherein the portion is at least partly located at a radius being smaller than the radial location of the elongated axial members, the portion further extending in at least a part of the circumference of the at least one first and second annular ring,
wherein the radially outer peripheral surface of the annular ring presenting the portion presents axial grooves at least at the circumference having the portion,
wherein each axial groove is located at the axial end face of each roller pocket in such a way that a roller can be inserted and pulled out via the axial groove into and out of each roller pocket, the axial grooves each having a groove radius equal to a roller element radius, the first and second annular ring being flexible such that the first and second annular ring can be compressed from a first position in which the first and second annular rings are circularly shaped and configured for operation in the toroidal roller bearing and a second a second position in which at least one of the first and second annular rings attains an oval shape such that the at least one roller element can be removed from the cage while the cage remains positioned between the inner and outer rings of the toroidal roller bearing
angularly displacing the inner ring relative the outer ring,
angularly and axially displacing the cage relative the inner ring in such a way that a part of the circumference of the radially inwardly extending portion is located axially outside the inner ring,
inserting or pulling out roller elements into or out of the roller pockets of the cage at the location where the portion is located axially outside the inner ring.

10. The method for assembling a toroidal roller bearing-according to claim 9,
wherein a step of inserting the cage between the inner ring and the outer ring is executed at least before the step of angularly and axially displacing the cage relative the inner ring.

11. The method for assembling a toroidal roller bearing according to claim 10,
further comprising angularly aligning the inner ring and the outer ring after inserting roller elements into the roller pockets of the cage.

* * * * *